United States Patent
Barnes

(10) Patent No.: US 8,186,206 B2
(45) Date of Patent: May 29, 2012

(54) POLYMER BASE FOR HYBRID POWERTRAIN AND NVH TEST INSTALLATIONS

(75) Inventor: Ken Barnes, Northville, MI (US)

(73) Assignee: AVL North America Inc., Plymouth, MI (US)

( * ) Notice: Subject to any disclaimer, the term of this patent is extended or adjusted under 35 U.S.C. 154(b) by 151 days.

(21) Appl. No.: 12/761,491

(22) Filed: Apr. 16, 2010

(65) Prior Publication Data
US 2011/0252877 A1 Oct. 20, 2011

(51) Int. Cl.
G01M 15/00 (2006.01)
(52) U.S. Cl. .................................. 73/116.05; 73/116.02
(58) Field of Classification Search ............... 73/116.01, 73/116.02, 116.03, 116.04, 116.05, 116.06
See application file for complete search history.

(56) References Cited

U.S. PATENT DOCUMENTS

| | | | |
|---|---|---|---|
| 3,491,587 | A | 1/1970 | Morris et al. |
| 3,978,712 | A | 9/1976 | Cowan et al. |
| 4,466,294 | A | 8/1984 | Bennington et al. |
| 4,489,597 | A | 12/1984 | Davison, Jr. |
| 5,693,896 | A | 12/1997 | Mistral et al. |
| 5,877,420 | A | 3/1999 | Moradi et al. |
| 5,908,982 | A | 6/1999 | Walsh et al. |
| 5,922,952 | A | 7/1999 | Moradi et al. |
| 6,378,374 | B2 | 4/2002 | Kochersberger |
| 6,698,293 | B2 * | 3/2004 | Reinisch et al. ................ 73/663 |
| 6,834,541 | B2 | 12/2004 | Nakanishi et al. |
| 7,107,829 | B2 | 9/2006 | Tachiki |
| 7,610,819 | B2 | 11/2009 | Barnes et al. |
| 2002/0023483 | A1 | 2/2002 | Reinisch et al. |
| 2007/0240517 | A1 | 10/2007 | Kingsbury et al. |
| 2009/0107255 | A1 | 4/2009 | Jensen |

FOREIGN PATENT DOCUMENTS
EP 1 840 551 A2 10/2007

OTHER PUBLICATIONS www.zanite.com/properties_zanite.html, "Zanite Polymer Composite," Apr. 16, 2010.
www.zanite.com/about_zanite.html, "Zanite Polymer Composite," Apr. 16, 2010.

* cited by examiner

*Primary Examiner* — Freddie Kirkland, III
(74) *Attorney, Agent, or Firm* — Carlson, Gaskey & Olds, P.C.

(57) ABSTRACT

A powertrain test installation is disclosed that includes a polymer base, which is supported on a concrete slab, for example. A dynamometer is mounted on the polymer base. A frame is mounted to the polymer base and is configured to support a powertrain component to be coupled to the dynamometer. The powertrain test system is installed, for example, by providing a floor, which is a concrete slab, for example. The floor is cut to provide a gap between a support floor and an adjacent floor that is arranged about the support floor. A polymer base is arranged on the support floor interiorly of the gap so that the polymer base is isolated from the adjacent floor. A dynamometer is secured to the polymer base. A frame is secured to the polymer base and is configured to support a powertrain test component, such as an electric motor.

16 Claims, 5 Drawing Sheets

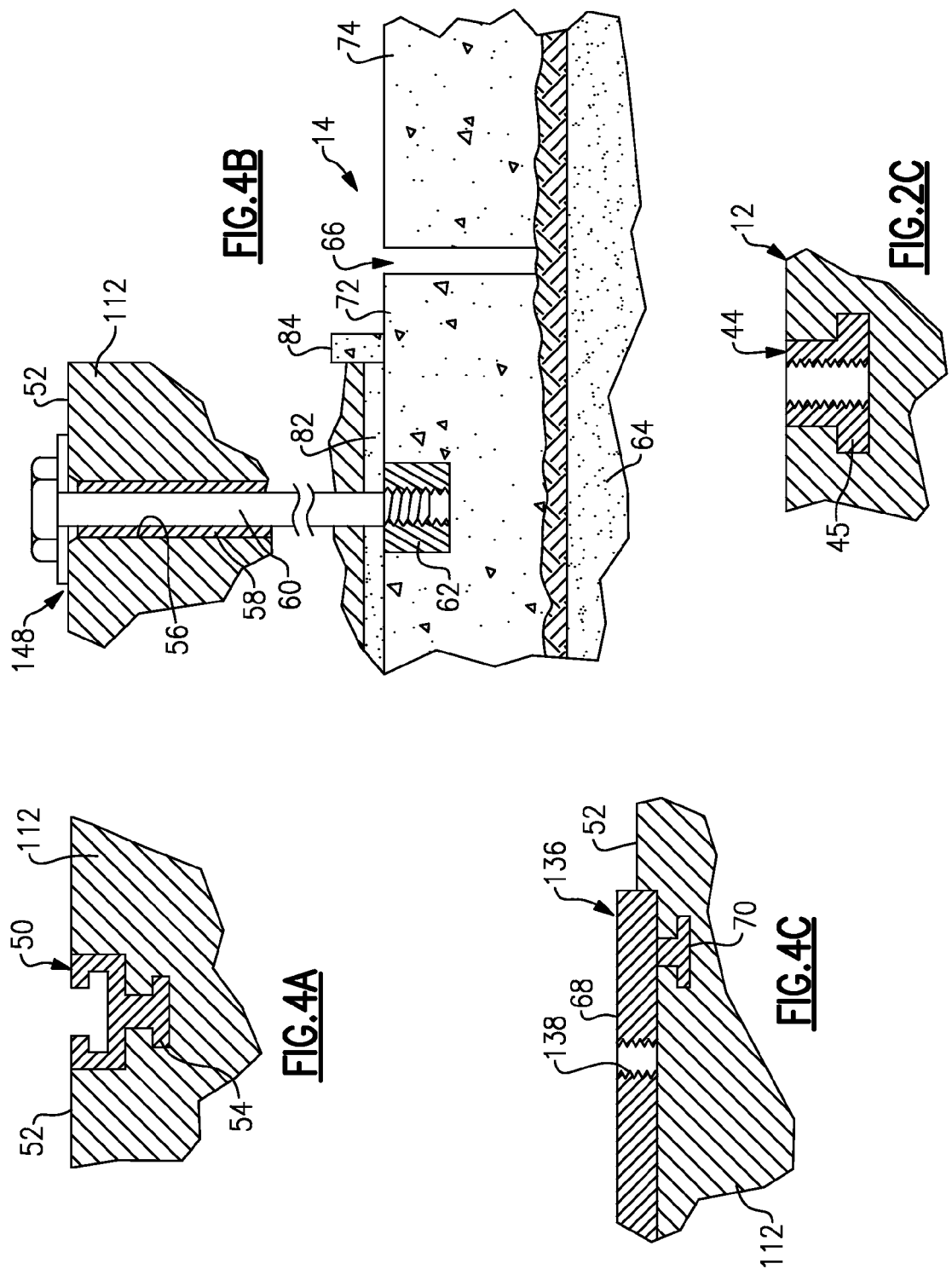

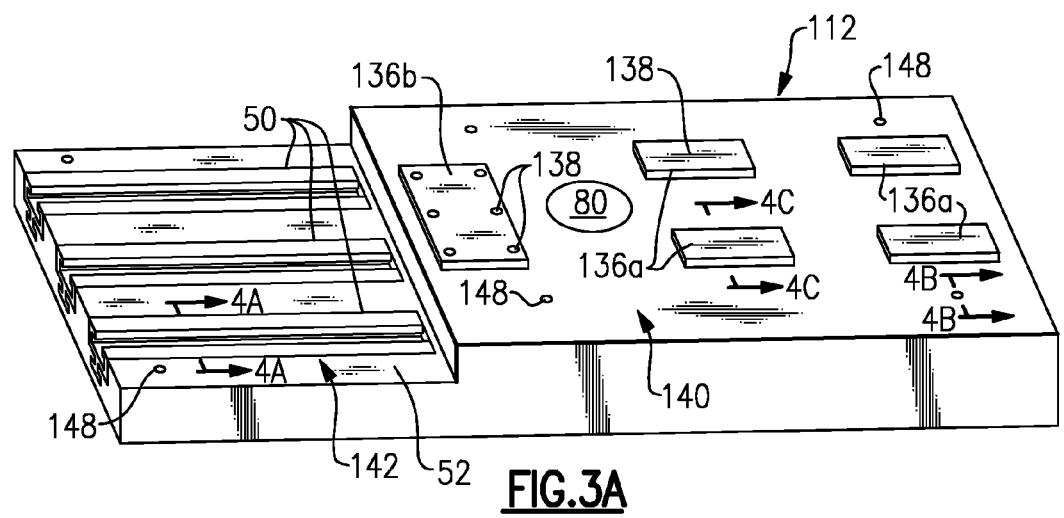
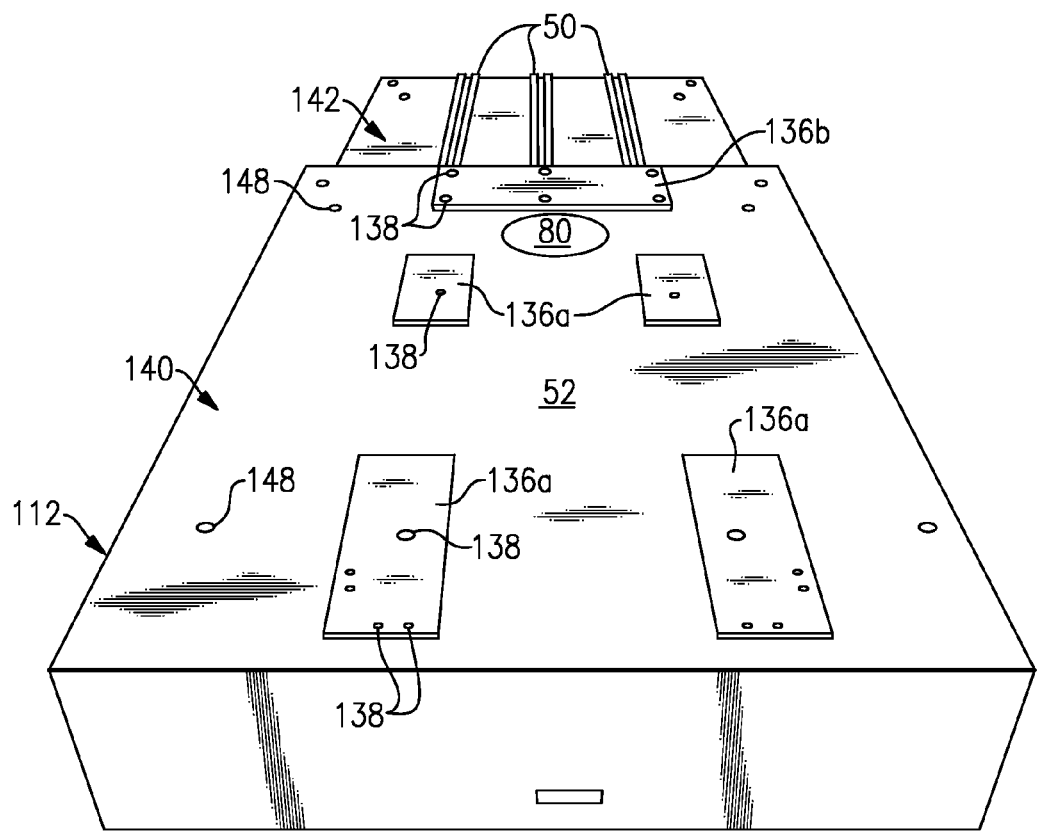

POLYMER BASE FOR HYBRID POWERTRAIN AND NVH TEST INSTALLATIONS

BACKGROUND

This disclosure relates to a powertrain tests installation and a method of installing a powertrain test system at a test site.

Powertrain test installations are used to simulate powertrain operating conditions without the need of a vehicle for which the powertrain is typically used. Typically, the powertrain test installation includes a dynamometer coupled to a powertrain test component, such as a motor. A frame supports the motor relative to the dynamometer in a desired position. The dynamometer opposes the rotational drive of the motor during a test procedure, which may simulate an engine or vehicle operating condition or government test cycle. The test installation may also be used to test noise/vibration/handling (NVH) characteristics.

Conventional powertrain test installations are very costly. A typical test site includes a concrete floor. The floor is prepared by cutting out a section of the concrete, which is broken up and removed. The exposed ground at the removed concrete section is excavated to provide a deep hole in which a large concrete seismic mass is poured. The concrete mass, which is isolated from the surrounding concrete, provides sufficient mass and strength to absorb the vibrational energy inputs from the motor and dynamometer during the test procedure. A steel bedplate and/or anchors may be provided in the concrete footing to which the motor and dynamometer are securely mounted. One type of bedplate is constructed from steel plates welded together. The steel plates occupy about 13% of the volume of the bedplate.

SUMMARY

A powertrain test installation is disclosed that includes a polymer base, which is supported on a concrete slab, for example. A dynamometer is mounted on the polymer base. A frame is mounted to the polymer base and is configured to support a powertrain component to be coupled to the dynamometer.

The powertrain test system is installed, for example, by providing a floor, which is a concrete slab, for example. The floor is cut to provide a gap between a support floor and an adjacent floor that is arranged about the support floor. A polymer base is arranged on the support floor interiorly of the gap so that the polymer base is isolated from the adjacent floor. A dynamometer is secured to the polymer base. A frame is secured to the polymer base and is configured to support a powertrain test component, such as an electric motor.

BRIEF DESCRIPTION OF THE DRAWINGS

The disclosure can be further understood by reference to the following detailed description when considered in connection with the accompanying drawings wherein:

FIG. 2C is a cross-sectional view taken along line 2C-2C in FIG. 2A.

FIG. 3A is a first side perspective view of another example base.

FIG. 3B is a second side perspective view of the example base shown in FIG. 3A.

FIG. 4A is a cross-sectional view taken along line 4A-4A in FIG. 3A.

FIG. 4B is a cross-sectional view taken along line 4B-4B in FIG. 3A, including a floor and ground.

FIG. 4C is a cross-sectional view taken along line 4C-4C in FIG. 3A.

DETAILED DESCRIPTION

Figure 1A:
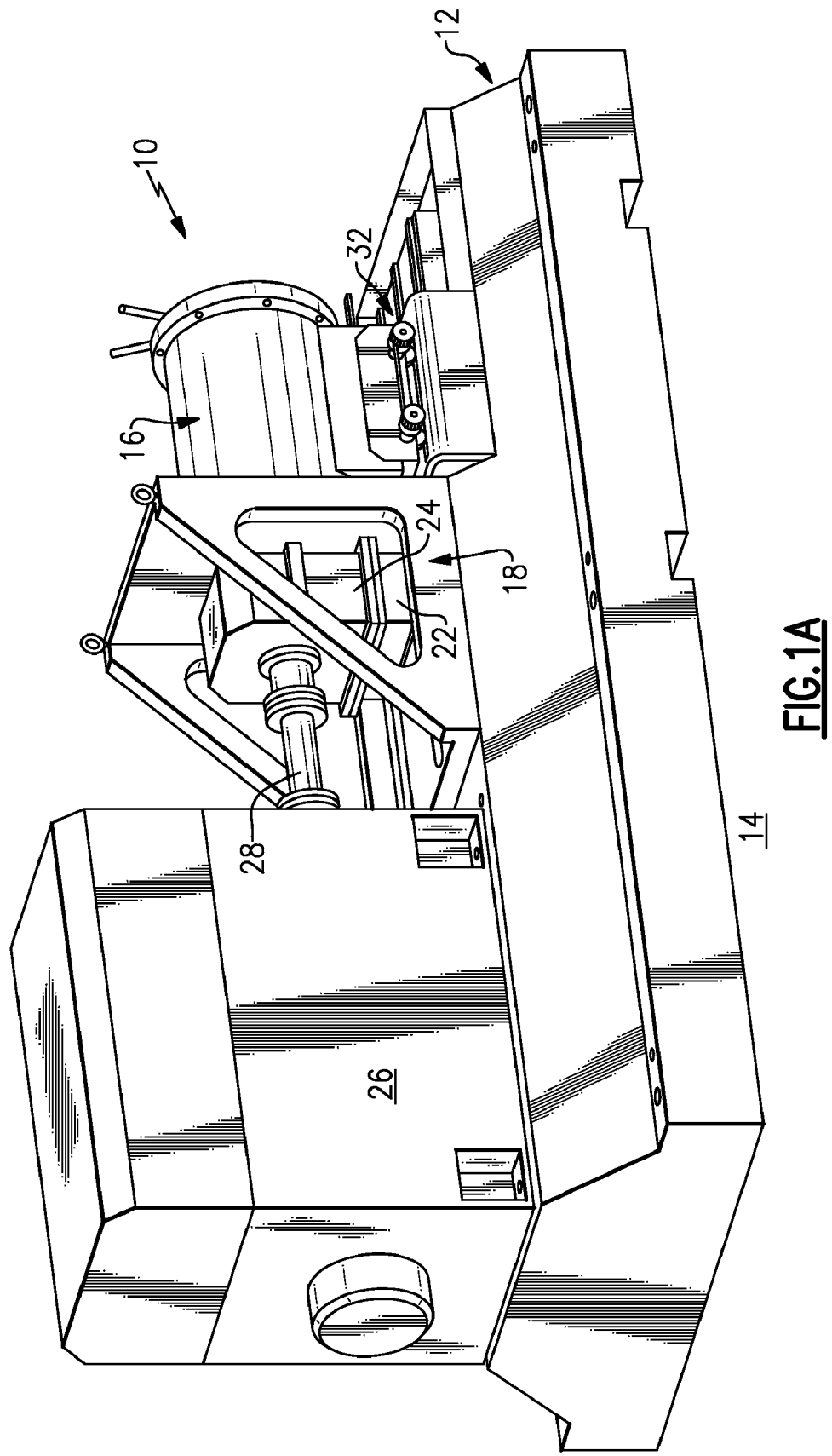
FIG. 1A is a first side perspective view of an example powertrain test installation.
Figure 1B:
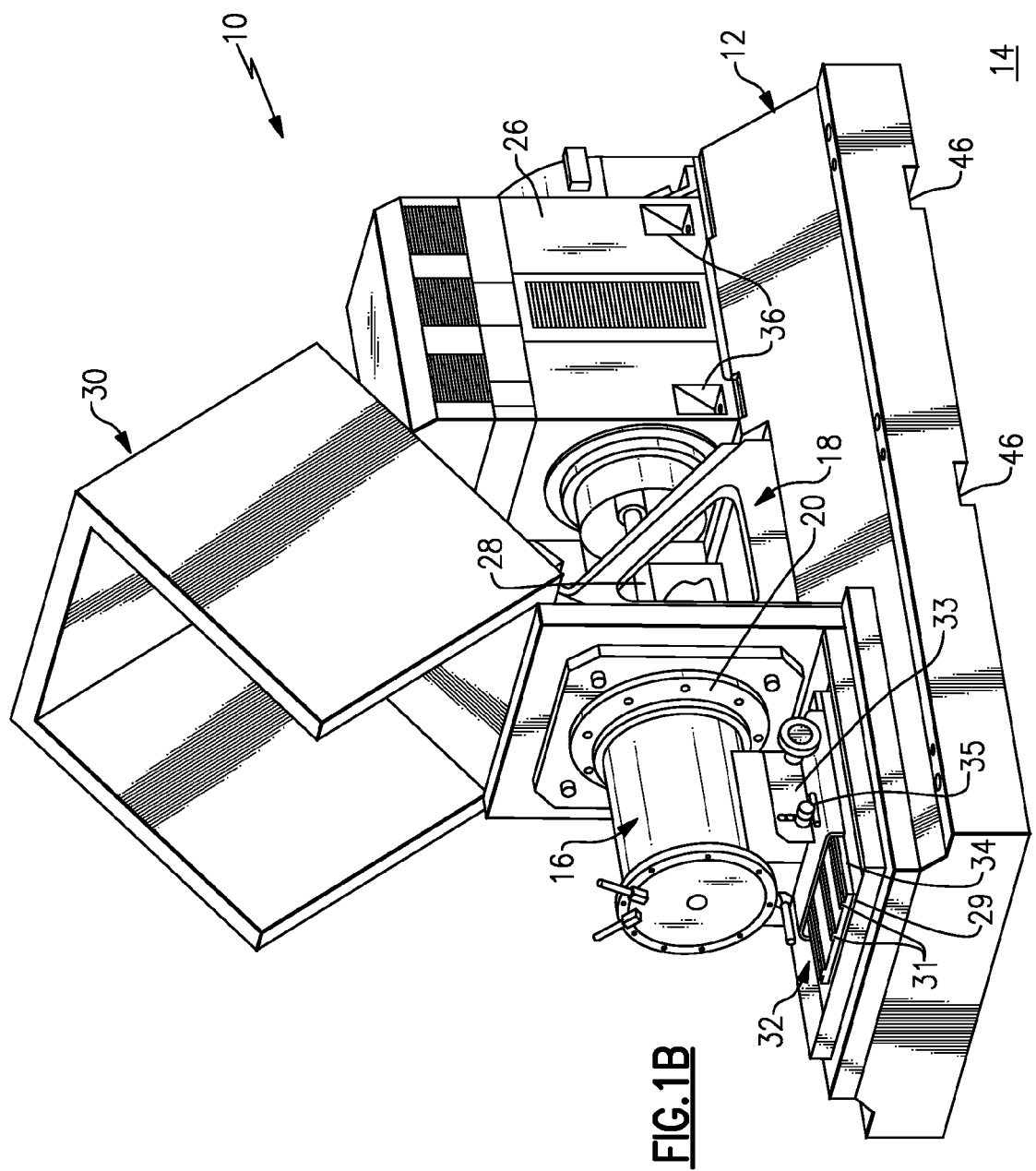
FIG. 1B is a second side perspective view of the powertrain test installation shown in FIG. 1A.

An example powertrain test installation 10 is illustrated in FIGS. 1A-1B. The example test installation 10 is for a hybrid powertrain, which uses an electric motor, having a rating of about 30 to 300 kW and speed of about 8,000 to 15,000 rpm. The installation 10 includes a base 12 that is constructed from a polymer material. In one example, the polymer material is a polymer composite constructed from a quartz aggregate and a high strength epoxy resin. One example polymer material is available through BaseTek under the tradename ZANITE, however, it should be understood that other polymer materials can be used.

The polymer material, which is cast or molded into a desired shape, is selected to have desirable noise and vibration characteristics for the particular powertrain test installation. For example, a given powertrain test installation may vibrate at a particular frequency range or ranges during various test procedures. The base 12 is tuned to dissipate these frequencies by selecting a desired polymer material formulation and/or dimensions of the base. As a result, minimal floor preparation is needed, which reduces the overall cost of the installation. It is also desirable in hybrid powertrains that utilize electric motors that the material used for the base 12 insulates so that electric motor is electrically isolated from the dynamometer. A typical powertrain test installation uses a single steel bedplate, which electrically connects the powertrain to the dynamometer. The polymer base of this disclosure takes the place of a conventional fabricated steel base. The polymer base is a solid casting and although the material is lighter than steel the total base weighs significantly more than a conventional fabricated steel base. Although the polymer composite material is only about a third of the weight of a steel, the overall weight of the case base 12 is over twice as much as a similar size steel-frame bedplate. This additional mass adds to the total seismic mass, which absorbs the vibration energy and negates the necessity for large expensive concrete masses.

An electric motor 16 is secured to a headstock 20 of a frame 18, which is mounted to the base 12. In one example, a pedestal 22 secured to the base 12 supports a gearbox 24 that is coupled to the electric motor 16. A dynamometer 26 is mounted to the base 12 and coupled to the gearbox 24 via a driveshaft 28. The dynamometer 26 is commanded by a controller (not shown) to oppose the rotational drive of the electric motor 16 to simulate a vehicle operating condition, for example, during a test procedure. An environmental enclosure 30 may also be used to surround the electric motor 16 to simulate cold and/or hot weather conditions during the test procedure.

An alignment device 32 is supported by protrusions 34 provided by the base 18, in one example. The alignment device 32 includes a support 29 providing rails 31. The electric motor 16 is mounted on a saddle 33 that is slidably supported on the rails 31 and movable relative thereto using an adjuster 35. The alignment device 32 facilitates installation and removal of the electric motor 16 relative to the headstock 20 prior to and subsequent to the test procedure.

Figure 2A:
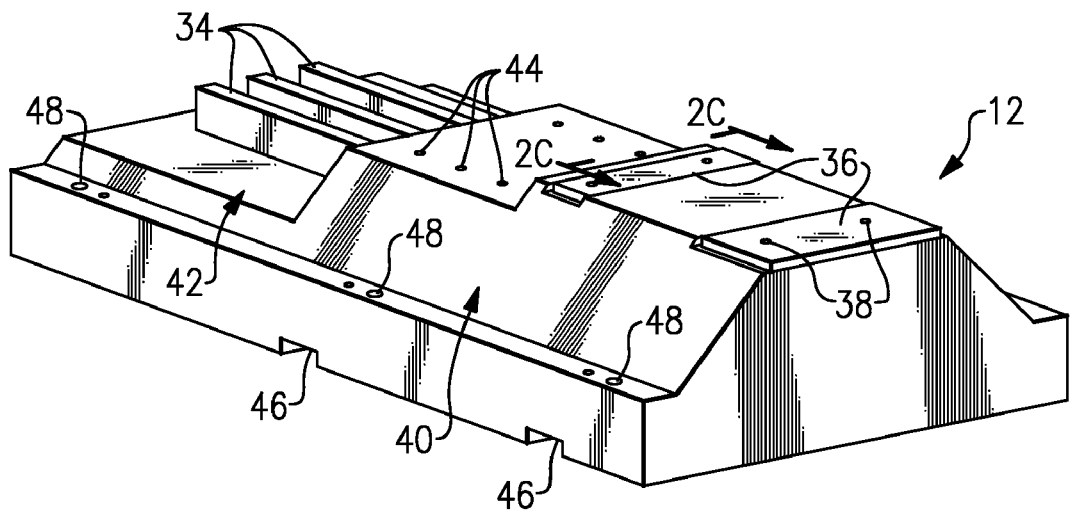
FIG. 2A is the second side perspective view of a base used to support a dynamometer and a powertrain test component.
Figure 2B:
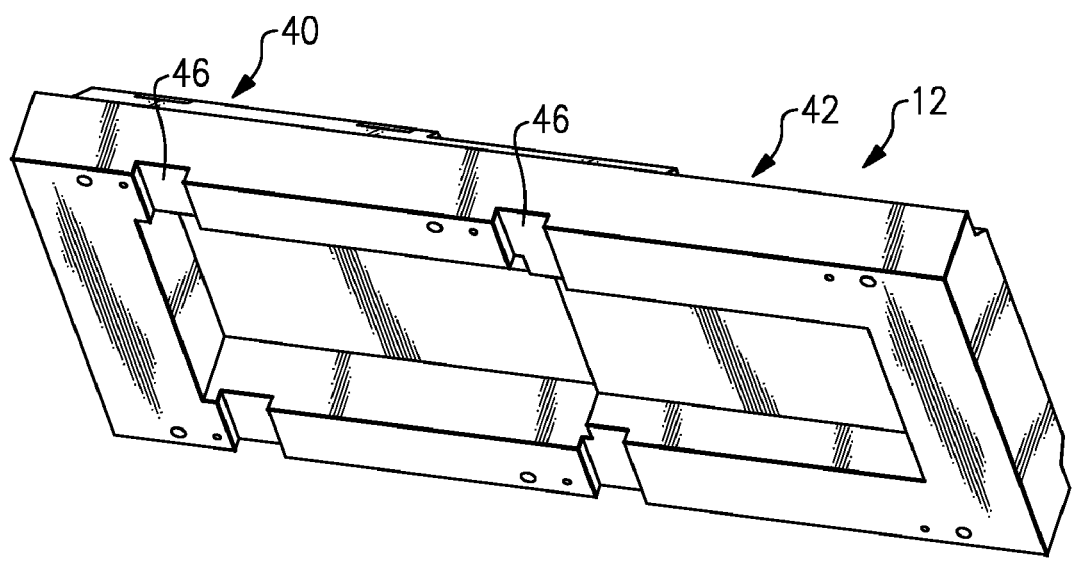
FIG. 2B is a bottom perspective view of the base illustrated in FIG. 2A.

The example base 12 is illustrated in FIGS. 2A-2C. The base 12 provides a unitary structure that includes a first portion 40 that is raised relative to a second portion 42. The first portion 40 is configured to support the dynamometer 26 via multiple embedded plates 36 having threaded holes 38 using fasteners (not shown), for example. Threaded mounts 44 (best shown in FIG. 2C) are embedded in the first portion 40 for securing the frame 18 to the base 12. The threaded mount 44 includes a retention feature 45, for example, that retains the threaded mount 44 within the cast structure of the base 12. The second portion 42 includes the protrusions 34 that are arranged generally parallel to one another. The protrusions 34 support the alignment device 32. In one example, the electric motor 16 under test typically has a female spline and the headstock 20 has a male spline. In order to ensure that the two components engage without damage, the dynamometer 26 is rotated at very slow speed as the electric motor 16 manually slides forward on the fixture. Once the splines are aligned they slide together and the electric motor 16 is rigidly bolted to the headstock face. The align/slide fixture can then be released. Floor attachments features 48 may be provided near the perimeter of the base 12 for securing the base 12 to the floor using fasteners (not shown). Fork apertures 46 may be provided in the base 12 that are configured to receive forks of a forklift when the base 12 is installed at the test site.

Another example base 112 is illustrated in FIGS. 3A-4C. Like numerals are used amongst the Figures to indicate like features. With the example base 112, channels 50 are cast into the second portion 142 to eliminate the protrusions 34 and provide the rails 31 of the base 12 (FIGS. 2A and 2B). The channels 50 are generally slightly proud with an exterior surface 52 of the base 112 in the example, best shown in FIG. 4A. The channels 50 include a retention feature 54 about which the base 112 is cast.

The floor attachment features 148 are provided by holes 56 each of which receive a sleeve 58, best shown in FIG. 4B. A fastener 60 is disposed within the sleeve 58 and is threadingly secured to an anchor 62 in the floor 14, for example (FIG. 4B).

The plates 136a, 136b, which may be used to mount the dynamometer 26, frame 18 and/or pedestal 22 on the first portion 140, include a support surface 68 having threaded holes 138. Fasteners (not shown) are used to secure the test components to the base 12 at the threaded holes 138. A retention feature 70 may be provided on the plates 136 opposite the support surface 68. In the example, the support surface 68 is proud of the exterior surface 52. The plates 136 are remote and isolated from one another.

During an installation procedure in which the powertrain test system is installed to in a test site, a floor 14, typically concrete, is cut, which provides a gap 66 between a support floor 72 and an adjacent floor 74 about the support floor 72, as shown in FIG. 4B. That is, the gap 66 provides a perimeter about a portion of the floor that will support the base 112. The area of the concrete floor that supports the base 12, although it may be in some cases, need not be broken out as is typical in a powertrain test installation for provide a relatively deep concrete footing. In a typical test installation, the concrete is broken and the ground 64 excavated to provide a hole much deeper than the adjacent floor to pour a concrete footing. The base 112 enables the existing concrete to be used, which provides support and adjacent floors 72, 74 of a generally uniform thickness.

The base 112 is arranged on the support floor 72 interiorly of the gap 64. A pouring hole 80 (FIGS. 3A and 3B) is provided in the base 112 and extends through to the lower surface of the base 112, exposing the floor 14. Once the base 112 is aligned on the floor 14 using jacking bolts, for example, small wooden dams 84 are constructed around the perimeter of the base such that the base is approximately 1" above the ground. Liquid non-shrink grout 82 is poured through the hole 80, and the grout flows under the base 112 and up to the dams 84, as shown in FIG. 4B. This provides an even surface under the polymer base 112 for complete support. Anchors 62 are provided in the support floor 72. Fasteners 60 are disposed in the floor attachment features 148 in the base 112 and secured to the anchors. A dynamometer 26 and frame 18 are secured to the base 112. The frame 18 is configured to support a powertrain component, such as an electric motor 16. The electric motor 16 is electrically and vibrationally isolated from the rest of the powertrain test components, including the dynamometer 16.

Although an example embodiment has been disclosed, a worker of ordinary skill in this art would recognize that certain modifications would come within the scope of the claims. For example, the retention features can be configured in a different manner than shown. For that reason, the following claims should be studied to determine their true scope and content.

What is claimed is:

1. A powertrain test installation comprising:
    a polymer base;
    a dynamometer supported on the polymer base;
    a frame supported on the polymer base and configured to support a powertrain component to be coupled to the dynamometer; and
    wherein the polymer base includes a quartz aggregate and an epoxy resin.

2. A powertrain test installation comprising:
    a polymer base;
    a dynamometer supported on the polymer base;
    a frame supported on the polymer base and configured to support a powertrain component to be coupled to the dynamometer; and
    multiple plates embedded in the polymer base and configured to support at least one of the dynamometer and the frame.

3. The powertrain test installation according to claim 2, wherein the plates are arranged remote and isolated from one another, at least one plate supporting the dynamometer and another plate supporting the frame.

4. A powertrain test installation comprising:
    a polymer base;
    a dynamometer supported on the polymer base;
    a frame supported on the polymer base and configured to support a powertrain component to be coupled to the dynamometer; and
    an electric motor coupled to the dynamometer, and the base electrically isolating the motor from the dynamometer.

5. The powertrain test installation according to claim 4, wherein the frame includes a headstock to which the electric motor is mounted.

6. The powertrain test installation according to claim 5, comprising rails provided on the polymer base, and an adjustment device arranged between the electric motor and the rails for moving the electric motor relative to the frame.

7. A powertrain test installation comprising:
    a polymer base;
    a dynamometer supported on the polymer base;
    a frame supported on the polymer base and configured to support a powertrain component to be coupled to the dynamometer; and wherein the polymer base includes floor attachment features configured to receive fasteners to secure the polymer base to a floor.

8. The powertrain test installation according to claim 7, wherein the floor is constructed from concrete and a gap is provided in the concrete with the polymer base supported on the floor interiorly of the gap, the concrete having a generally uniform thickness beneath the polymer base and outwardly of the gap.

9. The powertrain test installation according to claim 8, comprising a leveling material between the polymer base and the floor, and a pouring hole in the polymer base extending to the floor and configured to receive the leveling material.

10. A method of installing a powertrain test system comprising:
providing a floor with a gap between a support floor an adjacent floor about the support floor;
arranging a polymer base on the support floor interiorly of the gap;
securing a dynamometer to the polymer base; and
securing a frame to the polymer base, the frame configured to support a powertrain component.

11. The method according to claim 10, wherein the floor is constructed from concrete.

12. The method according to claim 11, wherein the providing step includes cutting the concrete to provide the gap.

13. The method according to claim 11, comprising the step of installing anchors in the floor and fastening the base to the floor using the anchors.

14. The method according to claim 11, comprising the step of shimming the polymer base from the concrete to provide a space and pouring a leveling material into the space to support the polymer base on the concrete.

15. The method according to claim 11, wherein the first securing step includes fastening the dynamometer to a plate embedded in the polymer base.

16. The method according to claim 10, wherein the first securing step includes fastening the frame to a plate embedded in the polymer base.

* * * * *